US012410621B2

(12) United States Patent
Baert et al.

(10) Patent No.: US 12,410,621 B2
(45) Date of Patent: *Sep. 9, 2025

(54) FLOOR PANEL AND METHOD OF MANUFACTURING A FLOOR PANEL

(71) Applicant: Champion Link International Corporation, The Valley (AI)

(72) Inventors: Thomas Luc Martine Baert, Sint-Martens-Latem (BE); Tom Van Poyer, Jiaxing Zhejiang (CN); Sven Boon, Jiaxing Zhejiang (CN)

(73) Assignee: Champion Link International Corporation, The Valley (AI)

( * ) Notice: Subject to any disclaimer, the term of this patent is extended or adjusted under 35 U.S.C. 154(b) by 0 days.

This patent is subject to a terminal disclaimer.

(21) Appl. No.: 18/429,657

(22) Filed: Feb. 1, 2024

(65) Prior Publication Data

US 2024/0209639 A1 Jun. 27, 2024

Related U.S. Application Data

(63) Continuation of application No. 17/381,602, filed on Jul. 21, 2021, now Pat. No. 11,927,020, which is a continuation-in-part of application No. 16/778,153, filed on Jan. 31, 2020, now Pat. No. 11,097,512.

(51) Int. Cl.
*E04F 15/00* (2006.01)
*E04F 15/10* (2006.01)

(52) U.S. Cl.
CPC .......... *E04F 15/105* (2013.01); *E04F 15/107* (2013.01)

(58) Field of Classification Search
CPC ..... E04F 15/02038; E04F 15/12; E04F 15/02; E04F 2201/023; E04F 15/105; E04F 15/107; E04F 15/00; Y10T 428/167; F16B 5/0012; B29B 17/0042; B29B 17/00; B29B 17/02
See application file for complete search history.

(56) References Cited

U.S. PATENT DOCUMENTS

| 2,944,291 A | 7/1960 | Prior et al. |
| 3,421,597 A | 1/1969 | Hans |
| 3,931,428 A | 1/1976 | Reick |
| 4,278,728 A | 7/1981 | Honda |
| 5,336,551 A | 8/1994 | Graiver |

(Continued)

FOREIGN PATENT DOCUMENTS

| CA | 2523866 | 11/2004 |
| CN | 100419019 | 2/2007 |

(Continued)

OTHER PUBLICATIONS

International Search Report and Written Opinion of corresponding Application No. NL 2025119 mailed Jan. 14, 2021.

(Continued)

*Primary Examiner* — Chi Q Nguyen
(74) *Attorney, Agent, or Firm* — Heslin Rothenberg Farley & Mesiti P.C.

(57) ABSTRACT

A panel suitable for constructing a floor or wall covering includes a core comprising a mineral composite comprising a mineral and a filler. The panel further comprises an additive within the core in order to improve the flexibility and/or tensile strength of the panel.

20 Claims, 1 Drawing Sheet

(56) References Cited

U.S. PATENT DOCUMENTS

Figure 1:
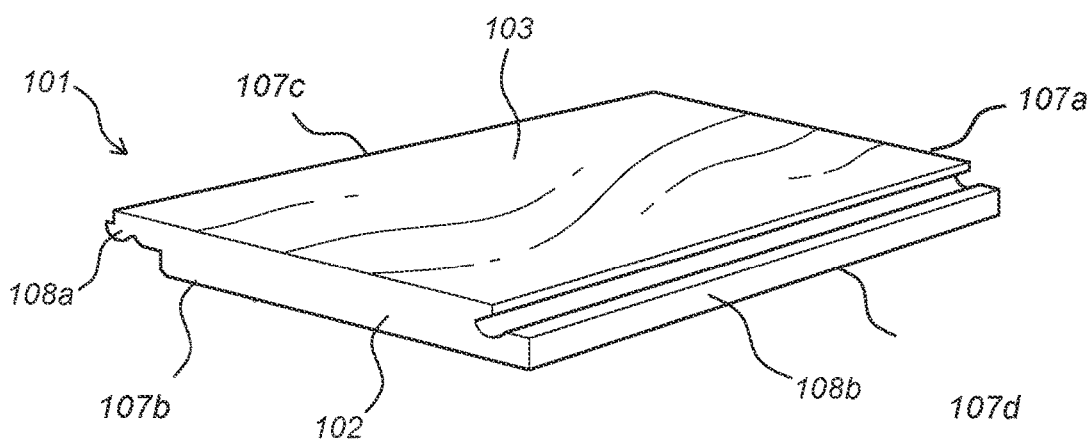

| | | |
|---|---|---|
| 5,631,053 A | 5/1997 | Andersen |
| 5,693,395 A | 12/1997 | Wine |
| 5,776,580 A | 7/1998 | Rasmussen |
| 6,688,061 B2 | 2/2004 | Garcia |
| 6,761,794 B2 | 7/2004 | Mott |
| 6,933,043 B1 | 8/2005 | Son |
| 7,255,907 B2 | 8/2007 | Feigin et al. |
| 7,399,510 B2 | 7/2008 | Dupouy |
| 7,866,103 B2 | 1/2011 | Marschke |
| 7,918,062 B2 | 4/2011 | Chen |
| 8,287,991 B2 | 10/2012 | Donelson |
| 8,419,877 B2 | 4/2013 | Pervan |
| 10,328,680 B2 | 6/2019 | Pervan |
| 10,828,881 B2 | 11/2020 | Bergelin |
| 11,097,512 B1 | 8/2021 | Baert |
| 11,639,605 B2 | 5/2023 | Boucke |
| 11,927,020 B2 * | 3/2024 | Baert ............... B32B 27/32 |
| 2003/0233809 A1 | 12/2003 | Pervan |
| 2005/0208258 A1 | 9/2005 | Hosokawa |
| 2005/0286397 A1 | 12/2005 | Inagaki |
| 2006/0115442 A1 | 6/2006 | Katz |
| 2007/0033891 A1 | 2/2007 | Imbabi |
| 2008/0149137 A1 | 6/2008 | Steinbrenner |
| 2008/0318004 A1 | 12/2008 | Ruhe |
| 2009/0011279 A1 | 1/2009 | Wisenbaker, Jr. et al. |
| 2009/0017320 A1 | 1/2009 | Donelson |
| 2009/0155612 A1 | 6/2009 | Pervan |
| 2009/0235607 A1 | 9/2009 | Chen |
| 2009/0308001 A1 | 12/2009 | Wu |
| 2010/0115974 A1 | 5/2010 | Okaza |
| 2011/0067336 A1 | 3/2011 | McDonald |
| 2011/0167744 A1 * | 7/2011 | Whispell ......... E04F 15/02038 |
| | | 52/309.1 |
| 2013/0192158 A1 | 8/2013 | Cappelle |
| 2013/0295346 A1 | 11/2013 | Ferguson |
| 2014/0087156 A1 | 3/2014 | Sarkis |
| 2014/0134402 A1 | 5/2014 | Pallon |
| 2014/0272302 A1 | 9/2014 | Ciuperca |
| 2015/0059621 A1 | 3/2015 | Hauber |
| 2015/0121793 A1 | 5/2015 | Segeart |
| 2016/0214395 A1 | 7/2016 | Torfs |
| 2016/0288447 A1 | 10/2016 | Cordeiro |
| 2016/0369507 A1 | 12/2016 | Pervan |
| 2017/0204616 A1 | 7/2017 | Scholz |
| 2017/0204619 A1 | 7/2017 | Rose |
| 2017/0217133 A1 | 8/2017 | Jordan et al. |
| 2018/0147873 A1 | 5/2018 | De Mondt |
| 2018/0258651 A1 | 9/2018 | Meersseman |
| 2018/0283014 A1 | 10/2018 | Hodgkins et al. |
| 2019/0003189 A1 | 1/2019 | Dohring |
| 2019/0292793 A1 * | 9/2019 | Van Vlassenrode .... B32B 27/22 |
| 2019/0308914 A1 | 10/2019 | Kong |
| 2019/0383031 A1 | 12/2019 | Baert |
| 2020/0039190 A1 | 2/2020 | Lenaerts |
| 2020/0080321 A1 | 3/2020 | Baert |
| 2020/0123788 A1 | 4/2020 | Baert |
| 2020/0131784 A1 | 4/2020 | Boucke |
| 2020/0207118 A1 | 7/2020 | Lenaerts |
| 2020/0215799 A1 | 7/2020 | Hedlund |
| 2020/0218415 A1 | 7/2020 | Jang |
| 2020/0223197 A1 * | 7/2020 | Hedlund ............... B32B 37/10 |
| 2020/0308846 A1 | 10/2020 | Josefsson |
| 2021/0198901 A1 * | 7/2021 | Josefsson ............... B32B 27/10 |
| 2021/0292237 A1 * | 9/2021 | Baert ................... E04F 15/102 |
| 2021/0372143 A1 * | 12/2021 | Baert ..................... B32B 29/06 |
| 2021/0387436 A1 | 12/2021 | Nilsson |
| 2022/0090391 A1 | 3/2022 | Nilsson |
| 2022/0281213 A1 * | 9/2022 | Gamstedt ............... B32B 27/22 |
| 2024/0209639 A1 * | 6/2024 | Baert ..................... B32B 9/002 |

FOREIGN PATENT DOCUMENTS

| | | |
|---|---|---|
| CN | 101386516 | 3/2009 |
| DE | 102012000468 | 7/2013 |
| EP | 2060389 | 5/2009 |
| EP | 2690142 | 1/2014 |
| EP | 3536874 | 9/2019 |
| GB | 2509821 | 7/2014 |
| JP | H0828015 | 1/1996 |
| KR | 20140066086 | 5/2014 |
| SE | 19503648 | 3/2019 |
| WO | 0222520 | 3/2001 |
| WO | 2007111552 | 10/2007 |
| WO | 2012004701 | 1/2012 |
| WO | 2014011110 | 1/2012 |
| WO | 2012061300 | 5/2012 |
| WO | 2014007738 | 1/2014 |
| WO | 2018234561 | 12/2018 |
| WO | 2019064113 | 4/2019 |
| WO | 2020009973 | 1/2020 |
| WO | 2020114645 | 6/2020 |
| WO | 2020197475 | 10/2020 |

OTHER PUBLICATIONS

International Search Report and Written Opinion of corresponding PCT Application No. NL2025684, mailed Mar. 3, 2021.
International Search Report and Written Opinion for corresponding App. No. NL 2024807 issued Sep. 18, 2020.
International Search Report and Written Opinion for corresponding App. No. NL 2024806 issued Nov. 26, 2020.
International Search Report and Written Opinion for corresponding PCT App. No. NL 2024805 issued Sep. 23, 2020.
International Search Report and Written Opinion for corresponding PCT App. No. NL 2026068 issued Feb. 4, 2021.
International Search Report and Written Opinion for corresponding PCT App. No. NL 2025620 issued Feb. 8, 2021.
International Search Report and Written Opinion for corresponding PCT App. No. NL 2026069 issued Feb. 5, 2021.

* cited by examiner

FLOOR PANEL AND METHOD OF MANUFACTURING A FLOOR PANEL

CROSS REFERENCE

This application is a continuation of U.S. Ser. No. 17/381,602 filed on Jul. 21, 2021, now U.S. Pat. No. 11,927,020, which is a continuation-in-part of U.S. Ser. No. 16/778,153, filed on Jan. 31, 2020, now U.S. Pat. No. 11,097,512, the entirety of which are herein incorporated by reference.

BACKGROUND OF THE INVENTION

1. Field of the Invention

The invention relates to a panel suitable for constructing a floor or wall covering. The invention also relates to the use of such panel. The invention further relates to a method of manufacturing a panel suitable for constructing a floor or wall covering.

2. Description of the Related Art

The flooring industry uses mainly traditional materials for manufacturing (laminated) floor tiles. Examples of commonly used materials are high density fiberboard (HDF), which can be merged together by a formaldehyde or phenol-based resin, heterogeneous or homogeneous polyvinyl chloride (PVC) which may possibly comprise any plasticizers, pieces of solid hardwood, or layers of veneers glued together, and fired and glazed clay such as ceramic and porcelain tiles. The purpose of use of these materials depends mainly on their material properties such as impact resistance, rigidity, acoustic performance and/or appearance.

An interest in the use of alternative materials has occurred relatively recently, mostly due to a demand from the market for greener or more sustainable products. A prime example thereof is the use of mineral materials, since mineral materials are usually abundant resources, generally benefit a relatively high compressive strength and dimensional stability and a resistance to heat and fire. As such, they have certain clear advantages over plastic and HDF-based flooring panels.

Mineral based floorings generally utilize two major raw materials: calcium and magnesium. These materials are processed and form the basis of hydraulic cement and non-hydraulic cement respectively. The cement is generally cured into the shape of a board and used as a core or carrier plate and laminated together with a decorative layer. Calcium-based or hydraulic cement panels feature a core board made of a cement based on calcium carbonate or silicate. The high alkalinity of these hydraulic calcium-based cements does not allow for the addition of reinforcing materials such as fiberglass. This has greatly restricted their popularity in the flooring industry, as they are too fragile to withstand the stresses that high foot traffic places on their locking mechanism. Magnesium-based panels have a core board comprising a non-hydraulic cement based on magnesium oxychloride or oxysulfate. This cement features excellent scratch resistance strength and fire-retardant properties so it is widely employed in the building materials industry to produce a fire-retardant alternative to gypsum or particle board wall panels. Recent improvements in magnesium cement technology, such as a higher density, and specific constructions of fiber meshes incorporated in the boards, allow for their use in flooring panels. Still, generally these magnesium-based boards are light-weight, around 1300 to 1500 kg/m3, and brittle. Like calcium-based hydraulic cements, they lack the flexibility required to be installed as a floor, even more so to be equipped with a locking mechanism on the side of the boards for floating installation. This would require a flexibility that is commonly accepted as being inherently impossible for this type of material. Hence, it is a goal of the invention to provide a mineral-based panel having an improved flexibility, allowing for use as a floor; and allowing for the milling of a locking mechanism at the side edges of the floor panel.

SUMMARY OF THE INVENTION

The primary objective of the invention is to provide a panel suitable for constructing a floor or wall covering. The panel comprises a core comprising at least one mineral composite comprising at least one mineral and at least one filler, wherein the core further comprises at least one dendritic additive within the core, and wherein the at least one the mineral and the at least one filler are present in a ratio of at least 3:1.

The addition of the at least one dendritic additive to the mineral based core, or the mineral composite, improves the flexibility and/or tensile strength of the core. The yield strength of the core, and thus the panel's carrying strength may be improved due to the use of a dendritic additive. This improves the ability of the mineral material for use in flooring purposes. Due to this improved flexibility and/or tensile strength, it is also enabled that interconnecting coupling means can be applied in practice for a (floor) panel having a mineral based core. The improved flexibility and/or tensile strength prevents breakage of the protruding parts of the coupling means provided at the edges of the panel when tension is exerted onto said protruding parts. The improved flexibility and/or tensile strength can be explained by the dendritic additive inducing dendritic crystal growth within the mineral based core; while at the same time, breaking up and centering the crystal structure. This may cause that in at least part of the core a web structure of crystals is obtained. At least one dendritic additive can, for example, be present in the form of three dimensionally expanded flexible crystallization matrix. Hence, the dendritic additive serves as a frame within the mineral material. The dendritic structure in the mineral based composition, or mineral composite, changes the overall material properties of the final product, i.e. the (floor) panel as such. Moreover, the addition of at least one dendritic additive does not negatively affect the dimensional stability and heat resistance of the panel.

Alternatively, the invention includes a panel, in particular a floor panel, suitable for forming a floor covering, wherein the panel has a substantially planar top side, and a substantially planar bottom side, at least four substantially linear side edges comprising at least one pair of opposite side edges, the panel comprising at least one core layer at least partially comprising a magnesium crystal structure. The crystal structure of mineral based cement, i.e. crystal-based cement, may include magnesium-, calcium-silicon- and aluminium-based cements comprising calcium sulfate dihydrate, calcium sulfate (gypsum), calcium silicate, tricalcium silicate, dicalcium silicate, tricalcium aluminate, tetracalcium alumino ferrite, calcium carbonate and the like, or magnesium-based cements comprising magnesium sulfate, magnesium chloride, magnesium phosphate and the like.

The panel according to the present invention is in particular suitable for use in flooring, wall or ceiling coverings featuring a locking mechanism. The panel comprises at least one pair of opposite side edges which are optionally provided with interconnecting coupling means for interconnecting adjacent panels. Preferably the panel according to the invention comprises two pairs of opposite side edges which are provided with interconnecting coupling means. As such a 'floating' covering can be assembled by interconnecting the individual panels with each other at all four sides, without the need for adhesives. It is further conceivable that the interconnecting coupling means comprise a tongue and a groove wherein the tongue is provided on one side edge of one pair of opposite side edges, and the groove is provided on the other side edge of the same pair of opposite side edges. Such a design of coupling means is well-known in the art and has proven highly suitable for panels for floor coverings such as a floating floor. In a further embodiment, it is possible that the interconnecting coupling means has an interlocking feature which avoids free movement (play) of interconnected panels. Such an interlocking feature may be a projection and a respective recess provided on the respective opposite side edges by which neighbouring panels interlock with each other.

The panel according to the present invention may comprise at least one top layer affixed to said core. The top layer may for example be a decorative layer or a wear layer. It is also conceivable that the top layer comprises a decorative layer and a wear layer covering said decorative layer. The decorative layer may be composed of a film provided and/or printed with a motif. The decorative layer may be a paper layer and/or a polymer layer, such as a PVC layer. The wear layer is commonly substantially transparent. The wear layer may consist of one or more transparent lacquer layers. Typically, the thickness of the layer(s) in the panel is in the range of 0.2 to 2.0 mm. The panel according to the present invention is typically a laminated panel. A decorative top layer, if applied, may for example comprise at least one ply of cellulose-based layer and a cured resin, wherein the cellulose-based layer is preferably paper or kraft paper. Said ply of cellulose-based material may also be a veneer layer adhered to a top surface of the core layer. The veneer layer is preferably selected from the group consisting of wood veneer, cork veneer, bamboo veneer, and the like. Other decorative top layers that could possibly be applied for the present invention include a ceramic tile, a porcelain tile, a real stone veneer, a rubber veneer, a decorative plastic or vinyl, linoleum, and decorative thermoplastic film or foil. The top layer may possibly be further provided with a wear layer and optionally a coating. Examples of thermoplastics which could be used in such top layer are PP, PET, PVC and the like. It is also possible to provide on the top facing surface of the core an optional primer and print the desired visual effect in a direct printing process. The decorative top layer can receive a further finishing with a thermosetting varnish or lacquer such as polyurethane, PUR, or a melamine based resin.

It is also conceivable that the panel comprises at least one backing layer affixed to the core. It is also conceivable that the panel comprises (at its back surface) at least one balancing layer, generally composed of at least one layer comprising lignocellulose and a cured resin. The panel may also comprise at least one acoustic layer, usually composed of a low density foamed layer of ethylene-vinyl acetate (EVA), irradiation-crosslinked polyethylene (IXPE), expanded polypropylene (XPP), expanded polystyrene (XPS), but also nonwoven fibers such as made from natural fibers like hemp or cork, or recycled/recyclable material such as PET or rubber. The density of this acoustic layer preferably has a density between 65 kg/m3 and 300 kg/m3, most preferably between 80 kg/m3 and 150 kgm3.

The dendritic additive can for example be a dendritic polymer. Such dendritic polymer can possibly have a monodisperse framework or a polydisperse framework. Non-limiting examples of possible dendritic polymers are dendrimers, dendrons, star polymer, hyperbranched polymer, dendrigrafts or linear-dendritic polymers. Due to the addition of the dendritic additive, it is conceivable that the internal structure of the core layer is full of a net- or web-like interlinked structure. This kind of net-like-structure is composed of centers spreading out inside the core layer and each center has branches extending out there-from and again interlocked with branches stretching out from another net-like structure, which eventually forms the overall net-like structure inside the core layer. From the nature of the structure, it is conceivable that the term "center" may be a dot, a circle or an elongated trunk. The dendritic additive is preferably non-linear. The dendritic additive can for example be a dendritic polyurethane. Further non-limiting examples of dendritic polymers are polylactic acid, polypropylene and/or polysiloxane. Per definition, one-dimensional and/or polymers with a straight chain do not fall within the scope of a dendritic additive according to the present invention. More options for dendritic additives may include hyperbranched polymers, hyperbranched geopolymers such as alumina-silicate binder materials, 3-dimensional alumina silicate structures, and dendrimers such as polysilanes, polysiloxanes, or ganosilicon nanoclusters.

Preferably, the core comprises in the range of 0.1 to 10 wt % dendritic additive, preferably in the range of 0.5 to 5 wt %, and more preferably in the range of 1 to 2 wt %. It is for example possible that the amount of dendritic additive is in the range of 0.1 to 5 wt % of the total weight of mineral material. It is experimentally shown that said ranges provide the most promising results with respect to the desired material properties for the goal of the invention.

It is conceivable that the core is a multilayer core. Hence, the core may comprise at least one upper core layer and at least one lower core layer, wherein at least the at least one core layer comprises at least one dendritic additive. It is also conceivable that at least the at least one upper core layer comprises at least one dendritic additive. Preferably all core layers comprise at least one dendritic additive. It is possible that different core layers have a different density. It is also possible that the density of the upper core layer is substantially homogeneous and/or that the density of the lower core layer is substantially homogeneous. It is conceivable that the core comprises at least one reinforcing layer. In a possible embodiment, the core comprises multiple core layers wherein two adjacent core layers enclose a reinforcing layer. It is also imaginable that at least one upper core layer and/or at least one lower core layer comprises at least one reinforcing layer. The presence of at least one reinforcing layer may further enhance the impact resistance of the core, and thus the panel. At least one reinforcing layer may for example be present in the form of a reinforcing mat, a membrane and/or a mesh. At least one reinforcing layer may for example comprise fiber glass, polypropylene, jute, cotton and/or polyethylene terephthalate.

At least part of the dendritic additive may possibly be a nano-dendritic additive. The use of nano-dendritic additive may positively affect the crystallization of the mineral material within the core. It is also conceivable that at least part of the dendritic additive has an average particle size in the range of 5 to 250 micrometer, preferably in the range of 50 to 100 micrometer. The surface area of the dendritic additive is for example in the range of 5 m2/g to 50 m2/g.

The invention also relates to the use of a panel according to the present invention. Hence, the invention relates to the use of a mineral based floor panel comprising a core comprising a dendritic additive.

The invention further relates to a method of manufacturing a panel suitable for constructing a floor or wall covering, in particular a panel according to the present invention, wherein the core is made by adding least one dendritic additive to a mineral material. The mineral material comprising the core may for example be a magnesium oxide or magnesia (MgO). The magnesia can be calcined in order to affect the reactivity of the material. With respect to the present invention, the magnesia is typically obtained via a calcination process which is applied at temperatures of about 600 to 1300 degrees Celsius, preferably between 800 and 1000 degrees Celsius, such that reactive magnesia, which has a relatively high reactivity, is obtained. Reactive magnesia is also known in the field as "caustic-calcined magnesia" or light-burned magnesia. Typically, this is a highly reactive calcined MgO with a relatively small crystallite size. The magnesium cement, which can be used as primary core material, can be produced by mixing this reactive magnesia with an aqueous magnesium salt solution (usually comprising $MgSO_4$, $MgCl_2$ and/or $MgCO_3$), then mixing this slurry with additives and water. Subsequently, the slurry is cured in order to form a ceramic material. This ceramic cement is poured onto a mold, and allowed to set, typically at either ambient or elevated temperature until it has cured.

The magnesium salt is preferably magnesium sulfate and/or magnesium chloride. The formation and microstructure of a magnesium oxide composition or cement can be described in "crystal" or "hydration" phases and expressed in terms of a ternary system consisting of the ratio of magnesia, a magnesium salt such as magnesium sulfate or magnesium chloride, and water. Crystalline phases are formed upon curing into a ceramic compound and can be expressed in an abbreviated version referring to the molar ratio of each compound in the crystal formed. Magnesium oxysulfate cement, which uses the salt magnesium sulfate as a key binding material, can form two stable crystalline phases under livable conditions; composed of the compounds magnesium oxide, magnesium sulfate and water, generally referred to as the 5-phase (also known as for example 5-1-3 phase, $5Mg(OH)_2 \cdot MgSO_4 \cdot 3H_2O$), and 3-phase (also known as 3-1-8 phase, $3Mg(OH)_2 \cdot MgSO_4 \cdot 8H_2O$). The former shows a beneficial needle- or whisker-like crystal structure of 0.2-1.0 μm diameter and a length of 20-50 μm that features good bending strength; whereas the latter shows a flaky or irregular crystal shape that results in a weaker composition. Similarly, magnesium (oxy)chloride cement which uses the salt magnesium chloride as a key binding material, is also known to form at least two stable crystalline phases under livable conditions, wherein the magnesium chloride crystalline phases can generally be present in a 5-phase (also 5-1-8 for $5Mg(OH)_2 \cdot MgCl_2 \cdot 8H_2O$) phase and/or a 3-phase (also 3-1-8 for $3Mg(OH)_2 \cdot MgCl_2 \cdot 8H_2O$). The former shows a beneficial needle- or whisker-like crystal structure of similar dimensions and shape to the magnesium sulfate cement meant 5-phase; whereas the latter shows also irregular crystal shape that results in a weaker composition. Another non-whisker crystal phase exhibiting a "flaky" structure includes magnesium dihydroxide ($Mg(OH)_2$).

Non-limiting examples of these cements which can be used are magnesium chloride (MOC), magnesium oxysulfate (MOS) or magnesium carbonate. The magnesium chloride cement can be present in the 5-1-8 phase ($5Mg(OH)_2 \cdot MgCl_2 \cdot 8H_2O$) or the 3-1-8 phase ($3Mg(OH)_2 \cdot MgCl_2 \cdot 8H_2O$). Both of these phases form needle- or whisker-like crystals which benefit from useable properties, such as a dense microstructure and high bending strength. Magnesium oxysulfate cement can be present in the 5-1-3 phase ($5Mg(OH)_2 \cdot MgSO_4 \cdot 3H_2O$) or the 3-1-8 phase ($3Mg(OH)_2 \cdot MgSO_4 \cdot 8H_2O$). The former shows a needle- or whisker-like structure of typically 0.2 to 1.0 micrometer in diameter and a length of 20 to 50 micrometer; whereas the latter shows a flaky crystal structure. In a preferred embodiment of this invention, the at least one whisker crystal phase of the magnesium crystal structure is chosen from the groups of magnesium oxysulfate (MOS) cement, $5Mg(OH)_2 \cdot MgSO_4 \cdot 3H_2O$ (5-1-3 phase), $5Mg(OH)_2 \cdot MgSO_4 \cdot 7H_2O$ (5-1-7 phase), $Mg(OH)_2 \cdot 2MgSO_4 \cdot 3H_2O$ (1-2-3 phase), $Mg(OH)_2 \cdot MgSO_4 \cdot 5H_2O$ (1-1-5 phase), $2Mg(OH)_2 \cdot MgCl_2 \cdot 4H_2O$ (2-1-4/2-1-2 phase), $9Mg(OH)_2 \cdot MgCl_2 \cdot 4H_2O$ (9-1-4-phase). It is found that the combination of the production method, the addition of the additive according to the invention, and the molar ratio of water to magnesium salt to magnesium oxide, further creates a further advantageous whisker 5-phase defined as 5-1-7. Preferably, the whisker crystal phase has an average diameter of 0.2 to 1.0 micrometre and an average length of 1 to 50 micrometres.

In a possible embodiment of the invention, $Mg(OH)_2 \cdot 2MgSO_4 \cdot 3H_2O$ (1-2-3 phase) and $Mg(OH)_2 \cdot MgSO_4 \cdot 5H_2O$ (1-1-5 phase), 2-1-4/2-1-2 phase (for $2Mg(OH)_2 \cdot MgCl_2 \cdot 4H_2O$), and 9-1-4-phase (for $9Mg(OH)_2 \cdot MgCl_2 \cdot 4H_2O$) are also advantageous in applications where a high processing temperature is required, such as when laminating this material in a hot press process, hot extrusion process, hot adhesion process, hot lamination process and the like due to their high heat resistance. The ratio of whisker-phase cement can be augmented when an additive comprising at least two hydroxyl groups are added therein in quantities of at least 0.1%, preferably at least 0.5%, more preferably at least 1%, such as phosphoric acid, citric acid and derivatives thereof (i.e citrate, phosphates). It was experimentally found that the combination of at least one step of applying pressure of at least 7 Mpa during curing, the molar ratio of water to magnesium salt to magnesium oxide, and the addition of said additive creates a larger ratio of the advantageous heat-resistant crystal phases than previously found possible.

In a possible embodiment of the invention, an increased ratio of mineral content to filler is at least 3:1, preferably at least 4:1, most preferably at least 5:1. These ratios are enabled by the use of the at least one dendritic additive. According to the current state of the art, a ratio of 2:1 mineral to filler is the limit in flooring panels in particular for flooring panels comprising interconnecting coupling means. The use of the mineral and filler being present in ration of at least 3:1 is that the increased mineral content results in an improved dimensional stability, for example when exposed to fluctuations in temperature and moisture. Further, this will enable lower cost in production and thus lower costs to end consumer. Another benefit of the mineral/filler ration according to the present invention is that there is less need for organic matter in the product. For example, the use of natural fillers such as wood dust is not sustainable and increasingly expensive nowadays. When it comes to polymer filler such as polystyrene or PVC, these fillers are not environmentally friendly, and cause concern about how to process the product at the end of its lifetime. A reduced ratio of filler versus mineral content is therefore desirable but difficult to achieve as it typically means a much more brittle board, especially when combined with an interlocking mechanism. At least one dendritic additive is preferably added to the abovementioned slurry during mixing prior to curing. The dendritic additive can achieve that a three-dimensionally expanded flexible crystallization matrix will be formed that serves as a frame for the crystallization of the mineral cement. This three-dimensionally expandable dendritic additive typically consists of a material that features a resemblance to or have dendrites, including linear or non-linear branched polymers, star polymers, dendrimers that can provide an interwoven skeleton to the setting magnesia cement crystals. When the term dendrimer is used, repetitively branched molecules can be meant. Typically, not included are any linear, one dimensional and/or straight-chained polymers such as polyethylene, nylon, polyester, PVC, PAN, alkanes or similar.

It is also conceivable that instead of a magnesium based core, any other crystal based cement is used in relation to the present invention, for example, calcium-silicon- and aluminium-based cements comprising calcium sulfate dihydrate, calcium sulfate (gypsum), calcium silicate, tricalcium silicate, dicalcium silicate, tricalcium aluminate, tetracalcium alumino ferrite, calcium carbonate and the like, or magnesium-based cements comprising magnesium sulfate, magnesium chloride, magnesium phosphate and the like.

Examples for dendritic polymer additives including hyperbranched polymers, hyperbranched geopolymers such as alumina-silicate binder materials, 3-dimensional aluminosilicate structures, dendrimers such as polysilanes, polysiloxanes, organosilicon nanoclusters, etc are also included in the preferred embodiments of the present invention.

The invention further relates to a method for producing a panel, in particular a floor or wall panel, preferably according to any embodiment of the present invention, the method comprising the steps of:
a) preparing a magnesium oxide composition comprising magnesium salt and water;
b) mixing at least one composition comprising at least one dendritic additive to the magnesium oxide composition to form a mixture;
c) optionally applying a force of at least 7 MPa to the mixture at a temperature in the range of 45 to 55 degrees Celsius for a predetermined period of time such that a core layer comprising an upper core surface and a lower core surface is obtained.

The invention further relates to a method for producing a panel, in particular a floor or wall panel, preferably according to any embodiment of the present invention, the method comprising the steps of:
(a) preparing a mineral composite comprising a mineral and a filler in a ratio of at least 3 to 1;
(b) mixing the at least one mineral composite and at least one dendritic additive such that a mixture is formed;
(c) applying heat and/or pressure to the mixture, for example by means of a panel-shaped mold, such that a core layer comprising an upper core surface and a lower core surface is obtained; and preferably
(d) allowing the core layer to set for a predetermined period of time.

The mineral composite can be subjected to at least one screening step. The screening step can also be a sieving step. The mineral composite can for example comprise magnesium oxide powder. The method may further comprise a step wherein at least one pair of opposite side edges of the panel is provided with interconnecting coupling means for interconnecting adjacent panels. This can be any conventional coupling means, such as aforementioned non-limiting examples. It is also conceivable that a mineral composite comprising a mineral and a filler in a ratio of at least 4:1 or preferably at least 5:1 is prepared during step (a).

The steps of said method are generally subsequent steps. After the pressure of step c) is released, a core layer, or core board whereof multiple core layers can be formed, is obtained. The method according to the preferred embodiment of the present invention allows to produce a core layer having a density in the range of 1200 kg/m3 to 2200 kg/m3, in particular between 1400 kg/m3 and 2000 kg/m3. The method also enables that a core layer can be obtained having a density which is substantially constant over the entire volume of the core layer. This can at least partially be explained by the pressure applied at step c). A substantially constant density is also beneficial for the overall strength of the panel. Typically, the mineral composite or mineral composition, e.g. cement, magnesium oxide cement, or crystal based cement, is formed by mixing at least one mineral component and a filler material. The mineral composite is in practice a substantially powdery composition. The mineral composite can also be classified as textured composition. Preferably, the mineral composition is mixed prior to at least one screening step. During at least one screening step, a mesh size between 10 and 35 mm could for example be applied. The screening step can, for example, be achieved by making use of a processor which preferably comprises brushes and/or screens, for example screens having a mesh size between 10 and 35 mm. It is also possible that multiple subsequent screening steps are applied to ensure that the screened magnesium oxide cement damp composition is even. It is conceivable that smaller mesh sizes are utilized to ensure an even mixing process, such as in the range of 15 microns to 0.1 mm.

The method according to the present invention allows to achieve panels having a rather consistent density, which can be at least partially explained by the combination of steps a) to c). These steps also at least partially prevent bubble formation and/or remove gas and/or bubbles present in the damp composition. Step c) enables the (chemical) reaction of the components of the mineral composite to finish and/or to cure the mineral composite. A further benefit of the method according to the present invention is that where conventional magnesium oxide cement based panels are typically produced by a process using excessive water, the panel according to the preferred embodiment of the present invention can produce via a more water efficient method. In practice, this means that substantially less watering process is used, and needed, during the production process and it also enables a significant reduction of the overall production time. Hence, no overload of water is applied during the production process, which is amongst others, beneficial from environmental point of view. Typically, a predetermined amount of water is applied for forming the mineral composite, wherein the amount is determined based upon the water required for the (chemical) reaction with magnesium oxide and optionally any further components and/or curing thereof. For example, the amount of water to be used can be controlled based upon the desired properties of the final product and the desired crystal structure in the core layer. More specifically, the amount of water in weight percentage or molar ratio added to the composition directly influences which crystal structure is formed in the core layer during the pressing phase.

Step c) of the method can, for example, be achieved via at least one pressing and/or compressing step. Step c) enables the removal of excessive liquid from the mineral composite. During step c), the mineral composite is typically dried and/or cured. The at least one screening step enables that a more even mineral composite can be obtained.

Where it is referred to a mold, a conveyer, container and/or a plate can also be meant. Basically, due to the mineral composite having a relatively functional structure, it is not required that the mold comprises raised edges and/or a rim. Typically, the mineral composite has a relatively low moisture content, wherefore it does not behave like a liquid. This enables easier handling of the composition during processing thereof. The method may for example involve applying a layer which is at least partially 4 to 7 cm in thickness of the mineral composite in or upon the mold during a semi-viscous state prior to setting. As indicated above, the method can also allow the production of core board whereof multiple core layers are formed.

As indicated above, a core layer comprising magnesium oxide cement and natural fibers, may have a density in the range of 1350 kg/m3 to 1550 kg/m3, resulting in a core layer having a relatively good flexural and structural strength.

Preferably, the mineral composite formed at step a) has a moisture content below 25 wt %, preferably below 10 wt %. It is for example possible that the mineral composite formed at step a) has a moisture content between 10 and 7+/−2 wt %. It is possible to apply such relatively low moisture content due to the combination and/or fractions of materials used and the process steps applied in the present method. As indicated above, in the prior art it is known to produce cement based panels, in particular magnesium oxide cement based panels via an extensive and time consuming process of drying of a magnesium oxide cement slurry, wherein the slurry contains at least 50 wt % of water, and often even over 60 wt % water. The need to use an overload of water is overcome by the method according to the present invention. The mineral composite may further comprise magnesium hydroxide, magnesium chloride and/or magnesium oxysulfate. The mineral composite may further comprise any of the additives and/or fillers as described for the present invention. The filler material is selected from the group comprising mineral material, glass material, a polymer material, or organic material. Glass materials can also be used as a filler such as those in the form of glass microspheres. It is also conceivable polymer materials can also be used in the core layer wherein both the polymer and glass materials as fillers reduce the overall weight of the floor panel. It is conceivable that organic materials are used as filler to reduce the overall weight while not compromising on degradability, such as cork granules, wood fibers, straw, rice husk, carbon based compounds, and the like. The filler can also be a polymer filler. The mineral composite may be a mineral filled with polymers. Other conceivable fillers are talc, calcium carbonate (CaCO3), perlite, polymer foam beads and/or a combination thereof. Possibly, at least one filler may comprise limestone. The core layer may for example comprise up to 25 wt % and preferably up to 10 wt % of fillers. The core layer and/or the magnesium oxide cement may also comprise at least one further additive. At least one additive can for example be chosen from the group consisting of: a pigment, a colorant, an impact modifier, a lubricant, a stabilizer, a wax, an anti-halogen agent and/or an aid processing agent. The core layer may for example comprise up to 5 wt % of additive(s), preferably up to 2 wt %. A non-limiting example is the core layer comprising up to 1 wt %, preferably up to 0.5 wt % and more preferably up to 0.25 wt % ferric oxide (FeO3). It is also conceivable that the core layer further comprises at least one compound selected from the group comprising of: calcium chloride (CaCb), calcium hydroxide CA(OH)2, sodium hydroxide (NaOH), aluminium sulphate (AL2(SO4)3) and/or sodium carboxymethyl cellulose, which may aid in the oxidization/decomposition of the core layer's composition into easily available forms thereby improving the workability thereof. As a result, the biodegrability of the panel is also improved. In yet another embodiment, the core layer may also comprise of silica fume which acts to enhance water resistivity and non-flammability of the panel. It is also conceivable to impart pigment in the magnesium oxide.

In a preferred embodiment, the mineral composite can be produced through means of an extrusion process, whereby the mineral composite is subsequently mixed with at least one filler material and at least one dendritic additive, heated, molded, and cured in an in-line process.

In a preferred embodiment, the dendritic additive is a compound comprising at least two hydroxyl (—OH) groups. Such additive can be a nanoscopic compound having a molecular size of 10 to 100 Angstrom. The hydroxyl (—OH) groups can also be a sub nanoscopic compound comprising a molecular size of 1 to 10 Angstrom. In a preferred embodiment, the compound comprising at least two hydroxyl groups comprises branched additives. The branched additives can have a densely branched polymer backbone and a large number of reactive groups or preferably, primary hydroxyl groups. This creates excellent processing properties at high molecular weights and facilitates customization of core layer properties. It is conceivable that the dendritic structures are formed by geopolymerization of the core material. As a result, advantageous crystal phases are obtained which provides the core layer excellent thermal and chemical resistance as well as improved mechanical properties. The desired dendritic additives may have at least 5 terminal hydroxyl groups, preferably more than 50 terminal hydroxyl groups and a molecular weight between 100 to 10,000 g/mol. It is conceivable that compounds with advantageous structures and at least two terminal hydroxyl groups include polysiloxanes, polysilanes, polysilylenes, polysilazanes, polycarbosilanes, polysilphenylenes, and combinations or derivatives thereof.

In one preferred embodiment, the dendritic additive comprising at least two hydroxyl (—OH) groups is at least one acid having a pH level between 3 to 6 or a pKa level between 3 to 7. Preferably, the additive comprising at least two hydroxyl (—OH) groups is an at least one acid selected from the group comprising of: citric acid, boric acid, formic acid (HCOOH), acetic acid (CH3COOH), benzoic acid (C6H5COOH), oxalic acid (C2H2O4), hydrofluoric acid (HF), malic acid (C4H6O5), nitrous acid (HNO2), sulfurous acid (H2SO3), phosphoric acid (H3PO4), or combinations thereof. It is also conceivable that the additive is a derivative of the acids selected from the group comprising of citric acid, boric acid, formic acid (HCOOH), acetic acid (CH3COOH), benzoic acid (C6H5COOH), oxalic acid (C2H2O4), hydrofluoric acid (HF), malic acid (C4H6O5), nitrous acid (HNO2), sulfurous acid (H2SO3), or phosphoric acid (H3PO4). It is preferably that the core layer comprises 0.05% to 5% by weight of at least one compound comprising at least two hydroxyl groups.

In one preferred embodiment, the dendritic additive is a dendritic polymer chosen from the groups of hyperbranched polyamine, hyperbranched polyamidoamine, hyperbranched polyether, glycerol/adipic acid hyperbranched poly(ester)s, hyperbranched PLA, and hyperbranched polyglycerol.

From the previous description, it is conceivable that during manufacturing process any kind of the above described acids is added to the formula to increase ratio of the whisker phase to the flake phase, the core layer stiffness is increased as the hyperbranched extensions of the whisker phase crystal structure closely connected to one another. In addition to that when an additive, such as a dendritic additive or a dendrimer additive, is added during the manufacturing process, the entire core layer strength would also be strengthened as the addition of the additive would ensure that there will be a lot of tree-like structure within the core layer. Combining the addition of an acid and a dendritic additive allows the internal structure of the core layer to form a net-like and hyperbranched or super-branched structure, which leads to the increase of internal stiffness to the core layer.

It is conceivable that natural fibers are added to the mineral composite after or during step a). The magnesium oxides damp composition may for example comprises at least 30 wt % natural fibers. The natural fibers may comprise at least one element chosen from the group of: wood fibers, bamboo fibers, animal fibers, and/or mycelium fibers. The natural fibers may be any of the above described natural fibers and may be present in any of the above described volumes. The average length of the natural fibers may for example be at least 2 mm. The natural fibers may comprise lignocellulose fibers, such as but not limited to wood fibers. Mixing of the mineral composite may contribute to at least part of the natural fibers being encapsulated by magnesium oxide cement. It is experimentally found that magnesium oxide and natural fibers effectively bond under pressure.

The method is typically performed under ambient conditions. However, it is also conceivable that the method is performed under vacuum or under a predetermined pressure above atmospheric pressure. Step c) is typically performed for a duration of at least 2 hours, preferably at least 4 hours. Step c) is in a further preferred embodiment performed for a duration between 6 hours to 12 hours. Afterwards, the panels can be demolded and/or cured. The method may comprise the step of demolding of the obtained core layer.

The boards or panels typically have an initial strength that is at least 50% of the final strength after said duration intervals, and are the sufficiently strong to be further processed.

Hence, the required process time is significantly shorter than the process time which are typically required for the production of a magnesium oxide based panel. Conventional processes for the production of a magnesium oxide based panel typically have a duration of at least seven days, which can be even longer in case a layer of fiberglass is included in the panel.

The method may optionally comprise the step of attaching at least one decorative top layer to an upper core surface of the core layer, preferably by applying heat and/or pressure. This step is made possible due to the technical possibility of avoiding the creation of a density gradient in the panel, in particular in the core layer of the panel, which is a result of the pressure applied at step c) and the consistency of the damp composition. It is also conceivable that a density gradient is present in the panel. It is possible to provide a core with a consistent density gradient, or a lack of density gradient, that being a core with an even specific gravity across the volume of the core.

The current method enables the production of a panel having a core layer with a density that is substantially constant over the entire volume of the core layer thereby increasing the overall strength thereof which allows the panel to withstand further application of heat and pressure without being damaged. With the core layer being free of any regions and/or zones having an increased density, which is typical of conventional magnesium oxide cement based panels, hot pressing of at least one layer of impregnated paper, or lignocellulose impregnated with a resin, to the upper and lower surfaces of the panel is made possible without causing the panel to warp or bend despite the core layer comprising magnesium oxide cement. Hot pressing of at least one layer of impregnated paper to the upper and lower surfaces of the panel is typically done by applying heat and pressure to the panel, more specifically to the core layer thereof. Optionally, the core layer can be subjected to a sanding process to increase adhesion prior to hot pressing. Preferably, the core layer is subjected to a temperature ranging from 100° C.-200° C., more preferably 170° C.-200° C., most preferably 175° C.-190° C. and to pressure ranging from 5-25 Mpa, more preferably 18-22 Mpa, most preferably around 20 Mpa. The application of heat and pressure to the core layer is conceived to last for at least 10 seconds to about 45 minutes, more preferably at least 30 seconds to about 90 seconds, most preferably at least 50 seconds to about 80 secs.

The method may also comprise the step of profiling and/or edging of at least one side edge of at least one panel, and in particular the core layer of the panel. Such step may for example involve that at least one pair of complementary coupling parts is provided at least two opposite side edges of the panel, preferably wherein the complementary coupling parts are configured such that in a coupled state a pretension is existing. In a preferred embodiment, the complementary coupling parts specifically contain a higher ratio of 5-phase whisker phase to 3-phase flake phase, allowing for a pretension to exist in the coupled state of the coupling parts due to the enhanced strength the 5-phase content provides to the coupling parts. It is possible and desirable therefore that the coupling parts contain a 5-phase to 3-phase magnesium cement of more than 1, where the rest of the core may have a different ratio.

The method may, for example, comprise a step of attaching at least one decorative top layer to the upper core surface of the core layer and/or attaching at least one balancing layer to the lower core surface of the core layer. Non-limiting examples of possible balancing layers and/or decorative top layers to be used are described above for the panel according to the present invention.

In a further possible embodiment, the layer of magnesium oxide damp composition is during step c) subjected to a force having a pressure between 7 MPa and 20 MPa. It is, for example, also possible that the magnesium oxide damp composition is subjected to a force having a pressure below 18 MPa. The preferred pressure applied is at least partially dependent of the desired thickness and/or density of the final product.

FIG. 1 shows a perspective view of a possible embodiment of a flooring panel (101) according to the present invention. The panel (101) comprises a core (102) comprising a mineral composite. The core (102) comprises two pairs of opposite side edges (107a, 107b, 107c, 107d). In the shown embodiment, a first pair of opposite side edges (107c, 107d) is provided with interconnecting coupling means (108a, 108b) for interconnecting adjacent panels (101). The shown interconnecting coupling parts (108a, 108b) are shown as an illustration, any type of conventional coupling parts could be applied. The core (102) comprises at least one dendritic additive.

Figure 2:
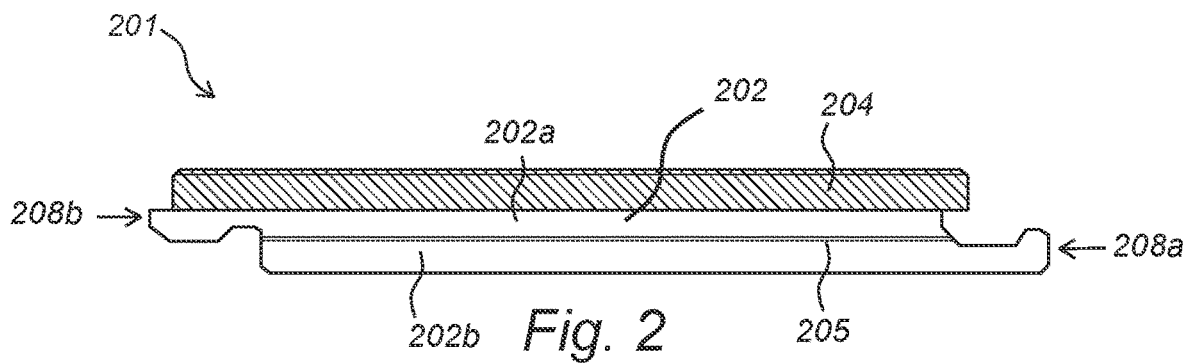

FIG. 2 shows a cross section of a further possible embodiment of a flooring panel (201) according to the present invention. The panel (201) comprises a core (201) which comprises a mineral composite and at least one dendritic additive. The panel (201) comprises interconnecting coupling means (208a, 208b) for interconnecting adjacent panels (201), which coupling means are optional. The panel (201) further comprises a top layer (204) affixed to the core (201). The core (201) is a multilayer core comprising an upper core layer (202a) and a lower core layer (202b). The two adjacent core layers (202a, 202b) enclose a reinforcing layer (205).

What is claimed is:

1. A panel for constructing a floor or wall covering, the panel comprising:
   a core comprising at least one mineral composite, the at least one mineral composite comprising at least one mineral and at least one filler,
   at least one top layer comprising at least one decorative layer and/or at least one wear layer covering said at least one decorative layer,
   wherein the core comprises at least one dendritic additive and wherein the at least one mineral and the at least one filler are present in a ratio of at least 3:1.

2. The panel as claimed in claim 1, wherein the at least one decorative layer is printed directly on a top surface of the core and optionally the at least one decorative layer comprises a primer layer.

3. The panel as claimed in claim 1, wherein the at least one decorative layer comprises at least one thermoplastic film and/or foil selected from the group consisting of polypropylene (PP), polyethylene terephthalate (PET), polyvinyl chloride (PVC) or combinations thereof.

4. The panel as claimed in claim 3, wherein said at least one thermoplastic film and/or foil is substantially transparent and/or at least partially printed with a motif.

5. The panel as claimed in claim 1, wherein the at least one top layer comprises at least one varnish or lacquer selected from the group consisting of coating, polyurethane (PUR), a melamine-based resin, or combinations thereof.

6. The panel as claimed in claim 1, wherein the mineral composite is a crystal-based cement.

7. The panel as claimed in claim 6, wherein the crystal-based cement is selected from a group consisting of: calcium-silicon- and aluminium-based cements comprising calcium sulfate dihydrate, calcium sulfate, calcium silicate, tricalcium silicate, dicalcium silicate, tricalcium aluminate, and tetracalcium alumino ferrite and comprises natural fibers of hemp, cork, PET and rubber.

8. The panel as claimed in claim 1, wherein the core has a density that is homogeneous over an entire volume of the core.

9. The panel as claimed in claim 1, wherein the mineral is selected from the group consisting of $MgSO_4$, $MgCl_2$, and $MgCO_3$.

10. The panel as claimed in claim 1, wherein the core is a multilayer core.

11. The panel as claimed in claim 10, wherein the core comprises at least one upper core layer and at least one lower core layer, wherein the at least one lower core layer comprises at least one dendritic additive.

12. The panel as claimed in claim 11, wherein the at least one upper core layer has a density that is homogeneous over an entire volume of the upper core layer and wherein the at least one lower core layer has a density that is homogeneous over an entire volume of the lower core layer and wherein the different core layers optionally have a different density.

13. The panel as claimed in claim 11, wherein the multilayer core comprises at least one reinforcing layer, wherein the at least one reinforcing layer is enclosed between at least one upper core layer and at least one lower core layer, and wherein the reinforcing layer is selected from a group consisting of fiberglass, polypropylene, jute, cotton and polyethylene terephthalate.

14. The panel as claimed in claim 11, wherein the at least one dendritic additive is a dendritic polymer selected from a group consisting of dendrimers, dendrons, star polymers, hyperbranched polymer, dendrigrafts, linear-dendritic polymers, hyperbranched geopolymers of alumina-silicate binder materials or 3-dimensional aluminosilicate structures and dendrimers of polysilanes, polysiloxanes and/or organosilicon nanoclusters.

15. The panel as claimed in claim 1, wherein the at least one dendritic additive is a dendritic polymer selected from a group consisting of dendrimers, dendrons, star polymers, hyperbranched polymer, dendrigrafts, linear-dendritic polymers, hyperbranched geopolymers of alumina-silicate binder materials or 3-dimensional aluminosilicate structures and dendrimers of polysilanes, polysiloxanes and/or organosilicon nanoclusters.

16. The panel as claimed in claim 1, wherein the dendritic additive is a nano-dendritic additive.

17. The panel as claimed in claim 1, wherein the panel comprises at least one acoustic layer composed of a low density foamed layer made of a material selected from a group consisting of: ethylene-vinyl acetate (EVA), irradiation-crosslinked polyethylene (IXPE), expanded polypropylene (XPP), expanded polystyrene (XPS) and nonwoven fibers.

18. The panel as claimed in claim 1, wherein the core comprises at least one pair of opposite side edges, said at least one pair of opposite side edges are provided with interconnecting coupling means for interconnecting adjacent panels.

19. The panel as claimed in claim 18, wherein the interconnecting coupling means comprises a tongue and a groove wherein the tongue is provided on one side edge of one pair of opposite side edges, and the groove is provided on the other side edge of the same pair of opposite side edges.

20. The panel as claimed in claim 1, wherein the core comprises in the range of 0.1 to 10 wt % dendritic additive.

* * * * *